Oct. 26, 1965  C. A. GONGWER  3,213,682
FLUID TURBULENCE DETECTOR
Filed March 6, 1961  6 Sheets-Sheet 1

INVENTOR.
CALVIN A. GONGWER
BY
ATTORNEY

INVENTOR.
CALVIN A. GONGWER

ATTORNEY

Oct. 26, 1965   C. A. GONGWER   3,213,682
FLUID TURBULENCE DETECTOR

Filed March 6, 1961   6 Sheets-Sheet 3

INVENTOR.
CALVIN A. GONGWER
BY
ATTORNEY

Oct. 26, 1965 C. A. GONGWER 3,213,682
FLUID TURBULENCE DETECTOR
Filed March 6, 1961 6 Sheets-Sheet 4
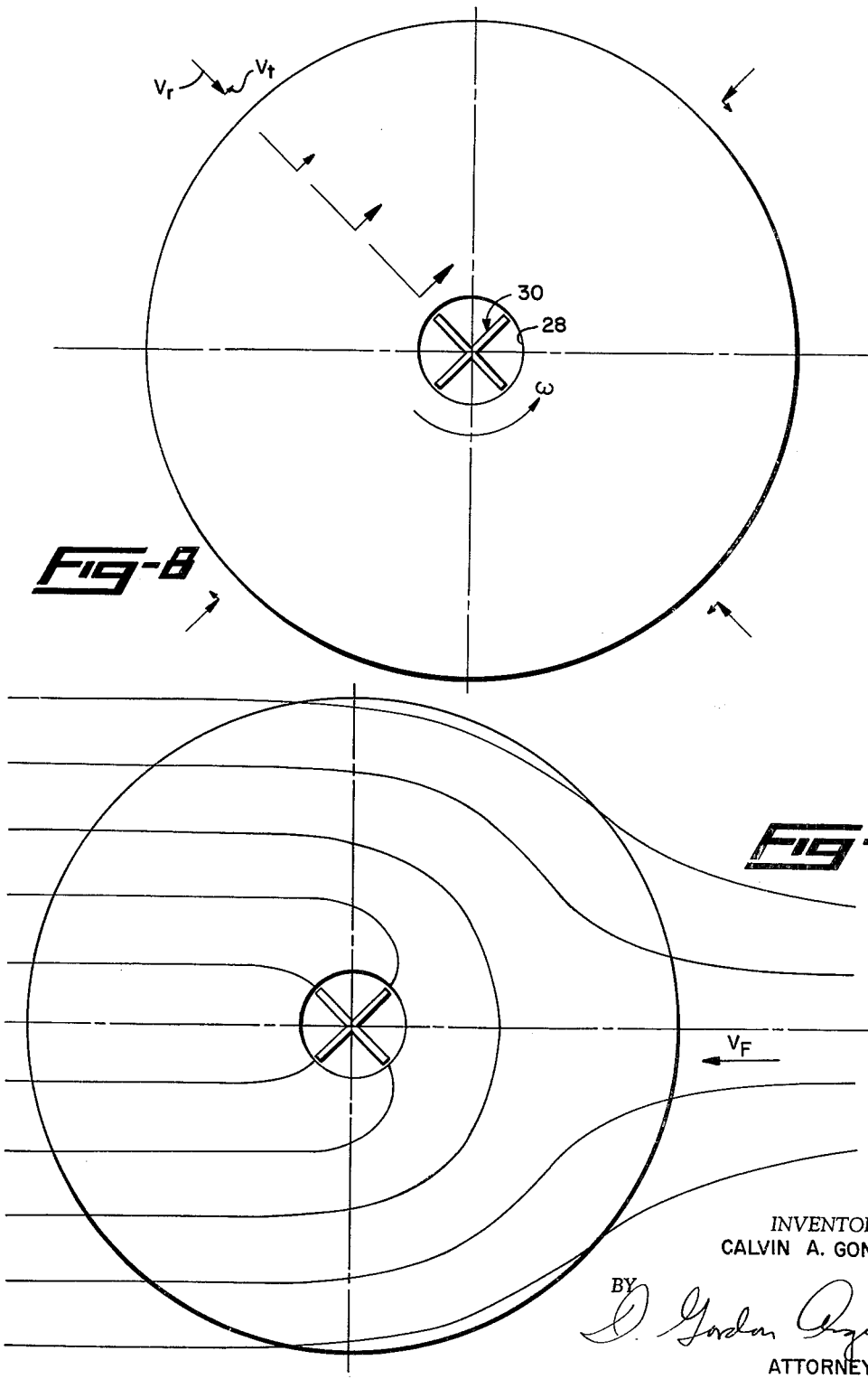
INVENTOR.
CALVIN A. GONGWER
BY
ATTORNEY Oct. 26, 1965 C. A. GONGWER 3,213,682
FLUID TURBULENCE DETECTOR
Filed March 6, 1961 6 Sheets-Sheet 5
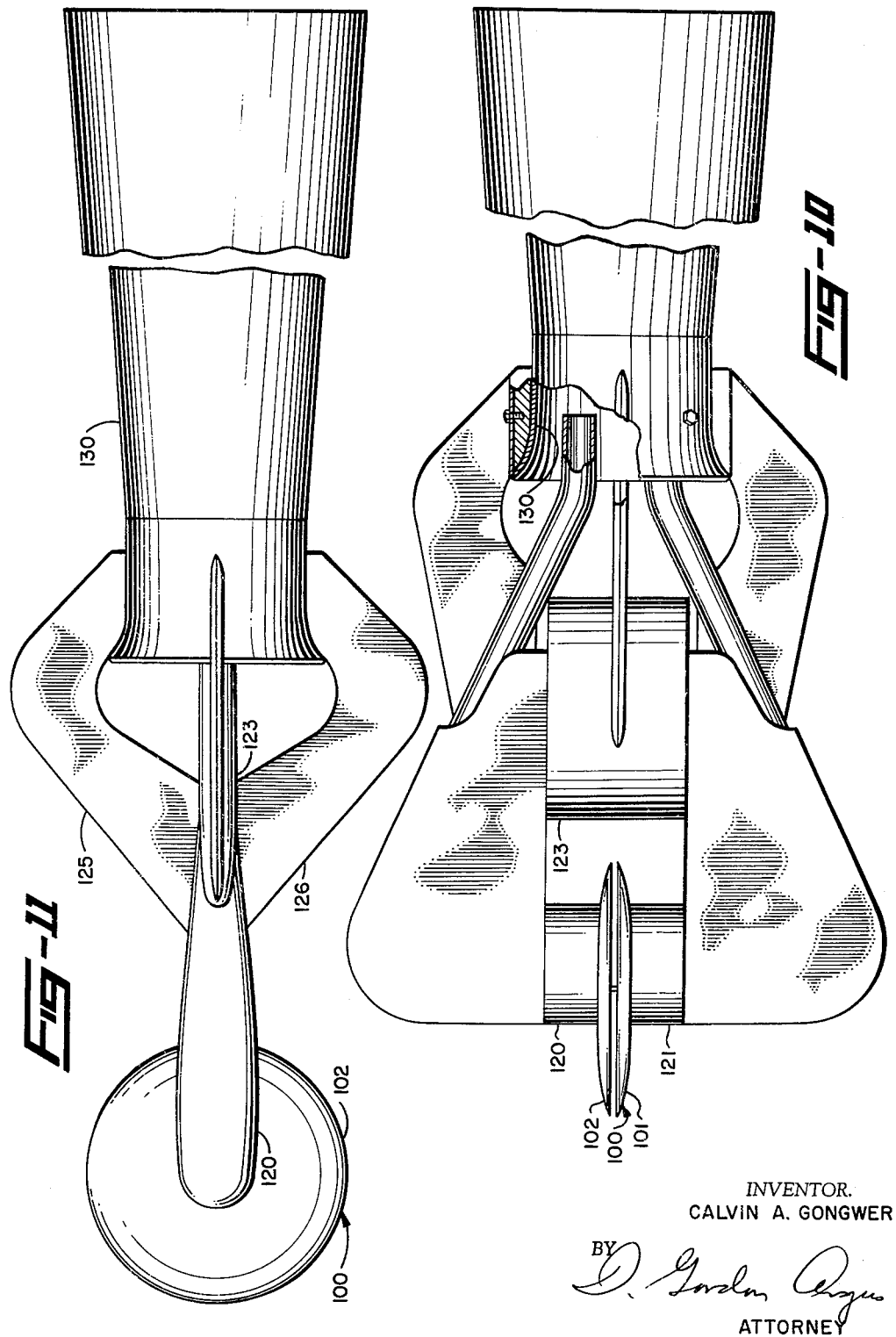
INVENTOR.
CALVIN A. GONGWER
BY
ATTORNEY

INVENTOR.
CALVIN A. GONGWER

BY D. Gordon Angus

ATTORNEY

United States Patent Office 3,213,682
Patented Oct. 26, 1965

3,213,682
FLUID TURBULENCE DETECTOR
Calvin A. Gongwer, Glendora, Calif., assignor to Aerojet-General Corporation, Azusa, Calif., a corporation of Ohio
Filed Mar. 6, 1961, Ser. No. 93,497
10 Claims. (Cl. 73—170)

This invention relates to detecting and measuring instruments and more particularly it relates to such instruments which can detect and measure turbulence present in a fluid medium. The object of the present invention is to provide a device which measures and tests vorticity or turbulence of a fluid.

The ability to readily detect and measure turbulent motion in the atmosphere and the ocean will enhance man's knowledge and understanding of the physical properties and dynamics of the medium. In addition, this capability is important to the understanding and engineering applications of the sciences of aerodynamics, meterorology, hydrodynamics and oceanography.

Broadly speaking, the nature of the phenomenon termed as "Fluid Turbulence" can best be described by pertinent quotations from the following authoritative sources: Sutton, O. G., "Atmospheric Turbulence and Diffusion," Compendium of Meteorology, American Meteorological Society, Boston, Mass., 1951, pp. 492–509:

"The Nature of Turbulent Flow. A particle in a stream of fluid can never follow a perfectly smooth path because of minute random disturbances arising from the molecular structure of the fluid (Brownian motion), but observation shows that, in certain circumstances, oscillations appear in the path which are much too large to be ascribed to molecular agitation. Such irregularities must imply the existence of rapid and apparently random fluctuations in the velocity of the stream, constituting a permanent and characteristic feature of this type of flow. Turbulence can hardly be defined in a strict mathematical sense, but is generally understood to imply a motion characterized by a continuous succession of such finite disturbances and in this sense nearly all natural motion, whether of water or of air, is turbulent. Only exceptionally is there found in nature a truly non-turbulent or laminar flow, in which the only random disturbances are the infinitesimal fluctuations due to molecular agitation.

"Anemometer records show that in general, and especially in the lower layers of the atmosphere, the wind is highly turbulent, the velocity being a complex of oscillations of duration varying from a fraction of a second to many minutes and of an amplitude which is often a substantial fraction of the average speed. Similar irregular oscillations are shown by direction indicators, so that the speed of the wind changes not only from instant to instant, but also from point to point of space. A complete specification of the velocity field over even a limited portion of the atmosphere is in practice unattainable and, to make progress, attention must be concentrated upon mean values and other statistical functions of the velocity. The study of atmospheric turbulence is chiefly concerned with the analysis of the mean distribution of momentum, heat, and suspended matter in, and as a result of, this high complex and rapidly changing field."

Sverdrup, H. V., Johnson, M. W., Fleming, R. H., "The Oceans," Prentice-Hall, Inc., Englewood Cliffs, N.J., 1942, p. 90:

"In nature, laminar flow is rarely or never encountered, but instead, turbulent flow, or turbulence, prevails. By turbulent flow is understood a state in which random motion of smaller or larger masses of the fluid is superimposed upon some simple pattern of flow. The character of the turbulence depends upon a number of factors, such as the average velocity gradients, and the boundaries of the system. Under these conditions the exchange between adjacent moving layers is not limited to the interchange of molecules, but masses of different dimensions also pass from one layer to another, carrying with them their characteristic properties. As a consequence, a snapshot of the instantaneous distribution of velocity, temperature, salinity and other variables in the sea would show a most complicated pattern, but so far, no means have been developed for establishing this picture."

It is evident from the foregoing quotations that it would be undesirable from an applied science point of view to develop an instrument so sensitive that it would detect the minute random disturbances arising from the molecular structure of the fluid. On the other hand it would seem that an instrument which could detect and measure the principal elements of turbulent motion of a fluid would be of great value.

It is common practice to define turbulence by one or more existing detection and measuring methods such as the following:

(1) A hot wire anemometer is used for measuring very small fluid velocities and rapid changes in velocity.

(2) A Pitot tube in combination with a vane is used for measuring instantaneous values of fluid velocity and direction.

(3) A Hemispherical-Cup Anemometer is used for measuring mean values of fluid velocity with respect to time.

(4) Wind gust accelerometers measure the magnitude and direction of accelerations caused by gross wind effects on aircraft and specially designed aerodynamic shapes.

With the exception of the hot wire anemometer, none of the foregoing methods are directed at the detection of fluid turbulence as noted previously. The hot wire anemometer detects and measures instantaneous fluid velocities only.

In contrast with the prior art, the present invention is used to detect and measure the strength and motion of the vortices and whirls that are characteristic of fluid turbulence.

Briefly, the present invention comprises a venturi-shaped whirl chamber with a vane wheel axially pivoted on jewel bearings in the venturi throat. A radial inflow passage with a circumferential opening is formed by two flat circular discs with a space between and positioned at right angles to the axis of the whirl chamber. Fluid flow may be induced through the system by connecting the suction side of a pump to the exit of the chamber.

Other features and advantages not specifically enumerated above will be apparent after consideration of the following detailed description and the appended claims. The preferred form which the invention may assume is illustrated in the accompanying drawings in which:

FIGURE 8 is a schematic view of the present invention showing the amplification of the radial inflow velocity and its tangential component;

FIGURE 9 shows the flow-line pattern of the dynamic sampling version of the present invention;

FIGURE 10 is a side elevation of the present invention as applied to a dynamic sampling device;

FIGURE 11 is a plan view of the dynamic sampling device shown in FIGURE 10;

Before explaining the present invention in detail, it is to be understood that the invention is not limited in its application to the details of construction and arrangement of parts illustrated in the accompanying drawing, since the invention is capable of other embodiments and of being carried out in various ways. Also, it is to be understood that the phraseology or terminology employed herein is for the purpose of description and not of limitation.

Figure 1:
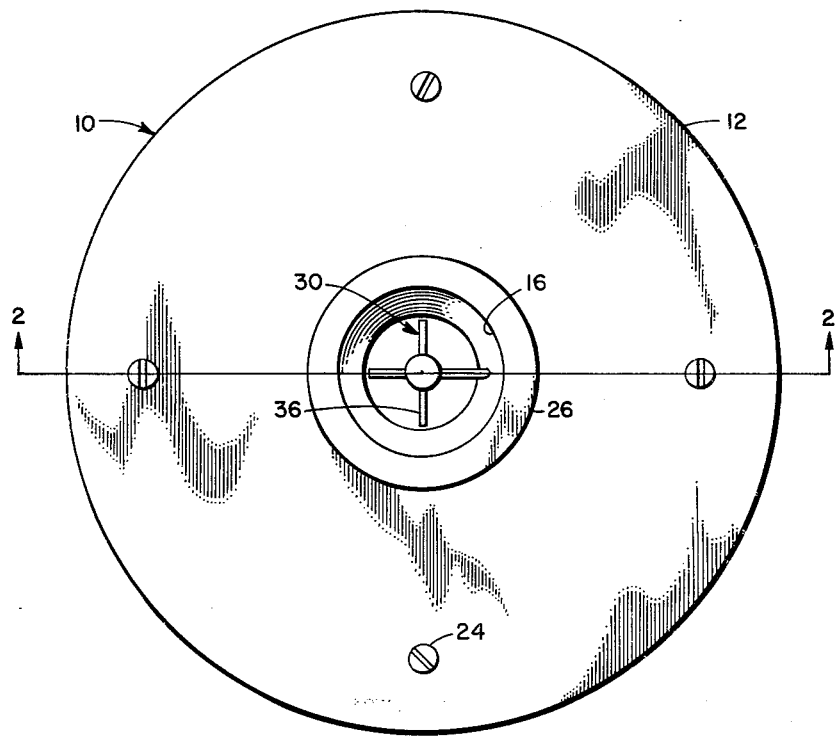
FIGURE 1 is a plan view of an embodiment of the static sampling version of the present invention.
Figure 2:
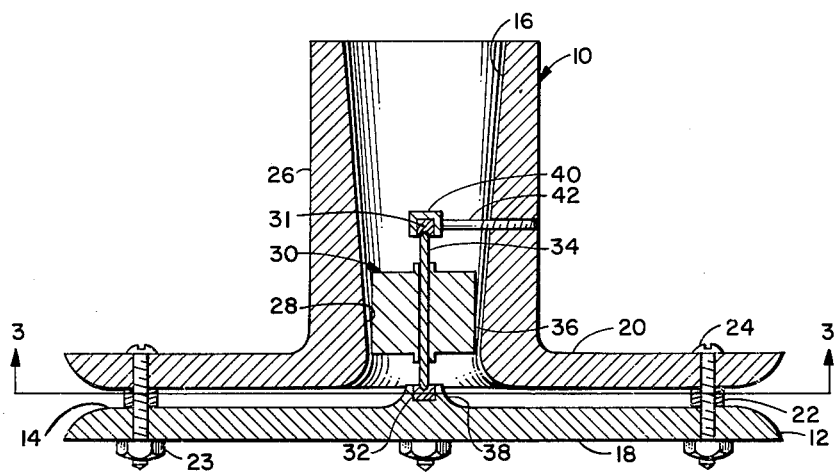
FIGURE 2 is a cross sectional view of the present invention taken along line 2—2 of FIGURE 1.

Referring to FIGURES 1 and 2, the turbulence or vorticity detector 10 comprises a housing 12 having a circumferential inlet 14 and an outlet 16. A pair of circular discs or plates 18, 20 are in spaced relationship to each other and provide an opening along its entire periphery. A plurality of spacers 22 are interposed between the two plates 18, 20 to hold the spaced relationship constant. A plurality of bolts 24 pass through the spacers 22 and both plates 18, 20 and are threadedly engaged with nuts 23. The inlet 14 has a curved flare on each plate 18, 20 to help guide any fluid flow through the gap between the plates 18, 20.

A cylindrical post 26 is integrally formed on the first plate 20 and has contained therein a venturi-shaped passageway 28. The first plate 20, the post 26, and the venturi-shaped passageway 28 are all co-axially positioned.

A vane wheel or impeller 30 is received by the passageway 28 and is rotatably supported by the jewel bearings 31, 32. The impeller 30 may be constructed from a shaft 34 having a plurality of axially positioned radially extending vanes 36 thereon. It is important to have the vanes 36 axially positioned since any variation of the vane position in relation to the axis of the shaft 34 may cause rotation from either symmetrical or unsymmetrical fluid flow past the vanes. The lower jewel bearing 32 is received by a protuberance 38 upstanding from the lower or second plate 18. The shape of the protuberance 38 aids in shunting all fluid flow from the gap between the two plates 18, 20 into the detector outlet 16. Note that the vanes 36 are in spaced relation to the throat of the venturi thereby being quite sensitive to all fluid passing through the outlet. It is entirely possible to have a larger gap between the passageway 28 and the vanes 36, thus lowering the sensitivity of the detector. It is also possible to use a straight-sided passageway for an outlet rather than a venturi but this change would also lower the sensitivity of the detector. The upper jewel bearing 31 is received by the cap 40 and an adjustment set screw (not illustrated) may be used to adjust the bearing tension on the rotatable shaft 34. The cap 40 and jewel bearing 31 assembly are supported within the outlet 16 by an arm 42 that is fixedly attached thereto.

The gap between the two plates 18, 20 is very important for in the instance that the gap is too large, the fluid flow through the detector cannot entirely be shunted through the outlet 16 and therefore cannot detect all the vorticity present. Conversely, when the gap becomes so small that the skin friction or skin effect overcomes any turbulence or laminar flow, the detector would be measuring the turbulence caused by the skin effect rather than the flow passing through the device. Briefly, the "skin effect" is the velocity boundary layer of a moving fluid past a stationary object where the velocity changes rapidly from zero adjacent to the object to the velocity of the free stream outside the layer. Through experimental determination, a suitable gap was found to be 3/16 inch used on a pair of plates seven inches in diameter.

Figure 3:
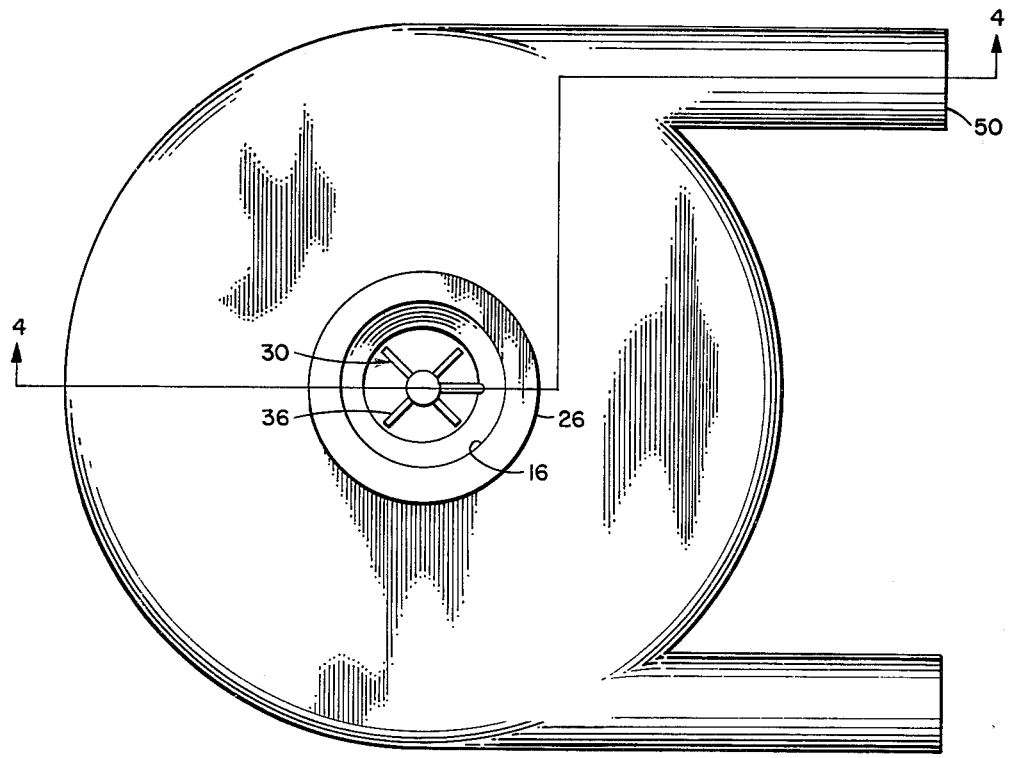
FIGURE 3 is a plan view of another embodiment of the present invention.
Figure 4:
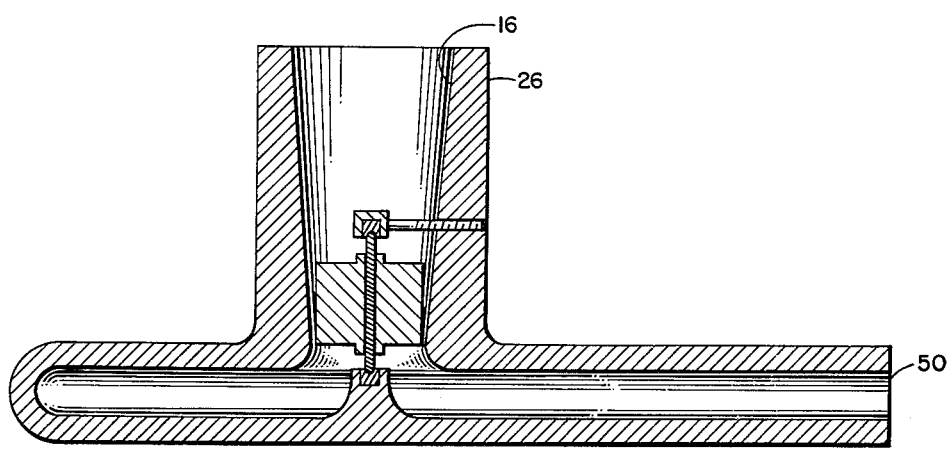
FIGURE 4 is a cross sectional view taken along line 4—4 of the embodiment shown in FIGURE 3.

Another embodiment of the present invention is shown in FIGURES 3 and 4. Note that the outlet, the impeller, the bearings, and the general configuration of the two plates are quite similar to those shown in FIGURES 1 and 2. The inlet portion 50 of the housing in this embodiment is limited to two pipe-like projections thereby limiting the areas to be tested for turbulent fluid flow. The casing in this embodiment is completely closed except for the inlet and outlet passageways thereby limiting the detection of turbulence to a particular volume under investigation.

Figure 5:
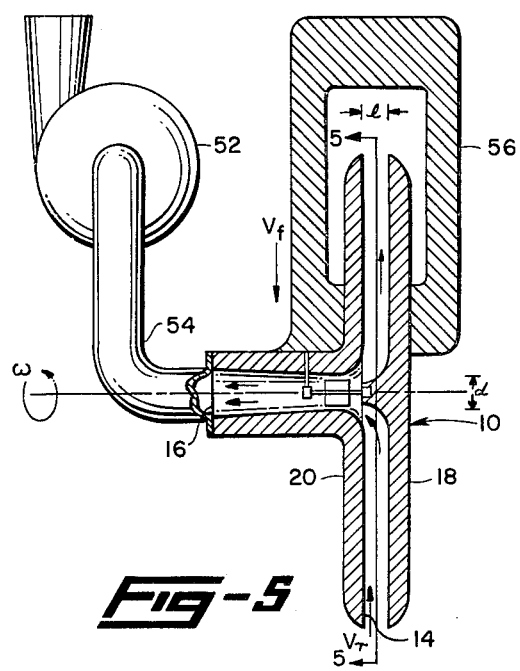
FIGURE 5 is a schematic view of the dynamic sampling version of the present invention.

FIGURE 5 illustrates the assembled detector 10 as it would be employed in a dynamic sampling situation. The centrifugal pump 52 or other suction means may be used to cause a fluid flow from the inlet 14 to the outlet 16. Any means to induce fluid flow may be used and communicates with the detector 10 via a conduit 54. Note that a C-shaped bracket 56 is used to support the pair of plates 18, 20.

Figure 6:
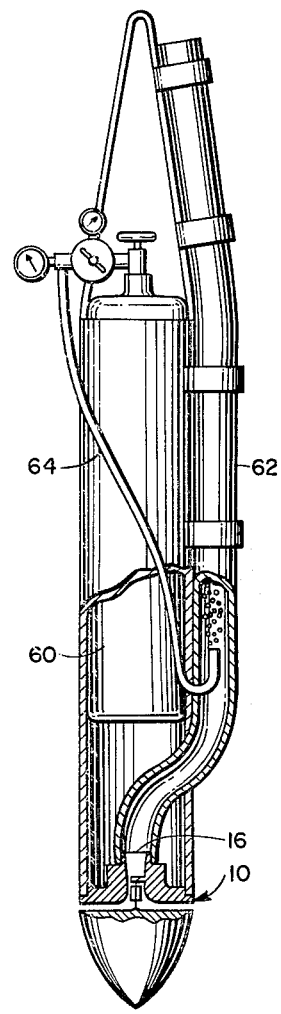
FIGURE 6 is a schematic view of the present invention, adapted for static sampling for turbulence.

A modified air lift pump is illustrated in FIGURE 6 attached in combination with the present invention. A source of compressed gas 60 is attached via a tube 64 to a conduit 62 in communication with the outlet 16 of the detector 10. As the compressed gas escapes into the conduit 62, fluid flow is induced through the outlet 16.

Figure 7:
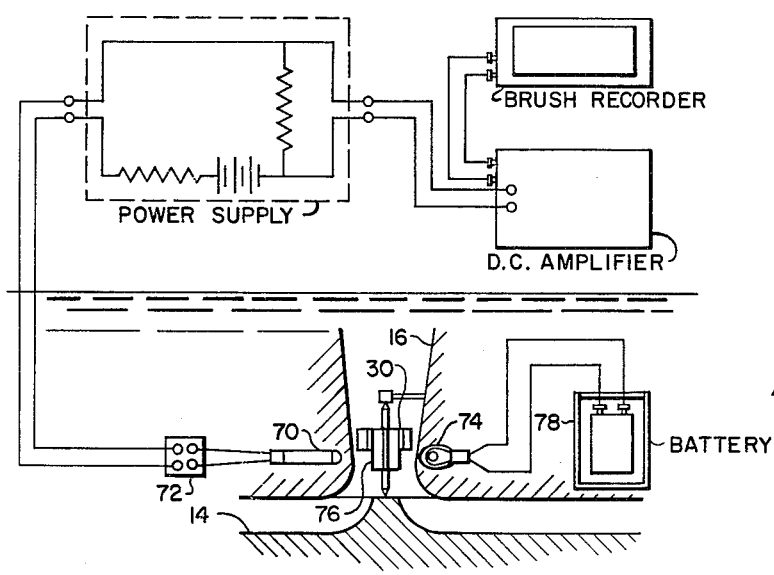
FIGURE 7 is a schematic view of the present invention used in combination with suitable recording equipment.

Referring to FIGURE 7, an instrumentation arrangement is schematically illustrated which may be used to count the number of revolutions made by the vane wheel or impeller 30 that are caused by turbulent action of a passing fluid. A light sensitive semi conductor termed as photo-diode 70 is supplied electric power through a 30 volt battery 72. A light source 74 positioned opposite the photo-diode 70 shines on the diode twice per revolution of the vane wheel 30 due to cut-out section 76 on a pair of diametrically opposite vanes. A three volt battery 78 supplies current to the light source 74. The presence of light shining upon the photo-diode will cause a change in resistance of the diode thereby effecting the current flow. This change in current is amplified by a D.C. amplifier connected in the circuit and recorded. A typical recording oscillograph can easily designate the number of pulses per unit time.

As presently conceived, the instrument has two operational modes, i.e., a static and a dynamic sampling situation. The static sampling mode is an arrangement in which the instrument is held stationary with respect to the mean motion of the ambient fluid. In the dynamic sampling mode, the instrument is moved through the ambient fluid.

FIGURE 8 is a schematic illustration of the static sampling device showing the characteristics of the radial inflow. It is a view taken along line 3—3 of FIGURE 2. The fluid sample enters the radial inflow passage from all directions and passes into the sink or throat of the venturi-shaped whirl passageway 28, moves past the vane wheel 30 and thence into the outlet 16.

If the ambient fluid being investigated is undisturbed, the sample entering the instrument will have no tangential velocity components ($V_t=0$), and therefore, it will be without angular momentum about the axis of symmetry. Accordingly, the flow through the throat will be symmetrically disposed with respect to the axis and the vane wheel will not turn.

On the other hand, if the ambient fluid is only slightly disturbed by the random motion of fluid masses with general boundary dimensions comparable to those of the instrument, the sample entering the radial inflow passage will contain a radial velocity ($V_r$) and a tangential velocity component ($V_t$) which will result in a continuously varying, net angular momentum of the fluid sample about the axis of symmetry.

The angular momentum is conserved as the sample is drawn into the small throat and consequently the angular velocity ($\omega$) is increased or amplified many times. The vane wheel 30 pivoted in the throat has excellent coupling with the fluid therein and therefore will rotate at essentially the same angular velocity as the fluid.

FIGURES 5 and 9 are schematic illustrations of the device when employed in the dynamic sampling mode. FIGURE 9 is a view taken along line 5—5 of FIGURE 5. The expected flow-line pattern is shown as the instrument is moved at a velocity of $V_f$ through an undisturbed fluid. With a specific inflow gap (1) and throat diameter ($d$), the throughflow rate (Q) must be proportional to the forward velocity so that the pattern remains similar to that shown in FIGURE 9. This is provided by using a suction device which provides a thru flow rate proportional to forward speed above a low finite speed value.

The behavior of the dynamic device is similar to that previously described for the static situation. When non-turbulent fluid is sampled, the flow lines are symmetrically disposed about the axis, and therefore no vane wheel activity will result. Presence of turbulence or vorticity will impart a net angular momentum to the sample, the angular velocity of which will be amplified and indicated by the vane wheel.

The character of the signals produced by the turbulence meter somewhat follows the behavior of the eddies or vortices which are characteristic of turbulent motion in a fluid. An eddy or vortex formed in a real fluid will rotate about an axis within itself and, depending on the viscosity, will impart this rotation to the surrounding fluid such that its velocity will vary more or less inversely with the radial distance from the vortex center. The strength, size, and random orientation of the vortices are a direct function of the source of the turbulence. Vortex strength is measured by the circulation and vortex size by the diameter at a characteristic location such as the transition region between solid and vortex flow.

The effect of these vortices on the fluid sampled by the meter is largely governed by the relative size of the disturbance with respect to the instrument (diameter of the vortices in comparison with the diameter of the turbulence meter) and the general orientation thereto.

Undirectional fluid circulation, as would usually occur with a large-diameter vortex several orders of magnitude greater in diameter than the meter and rotating at low velocities, would be characteristic of very low turbulent activity. The turbulence meter would sense this condition in the form of fairly steady revolution counts in one direction for relatively long periods of time. Under these circumstances, the direction of rotation of the vane wheel is governed by the direction of vortex rotation or fluid circulation.

Figure 13:
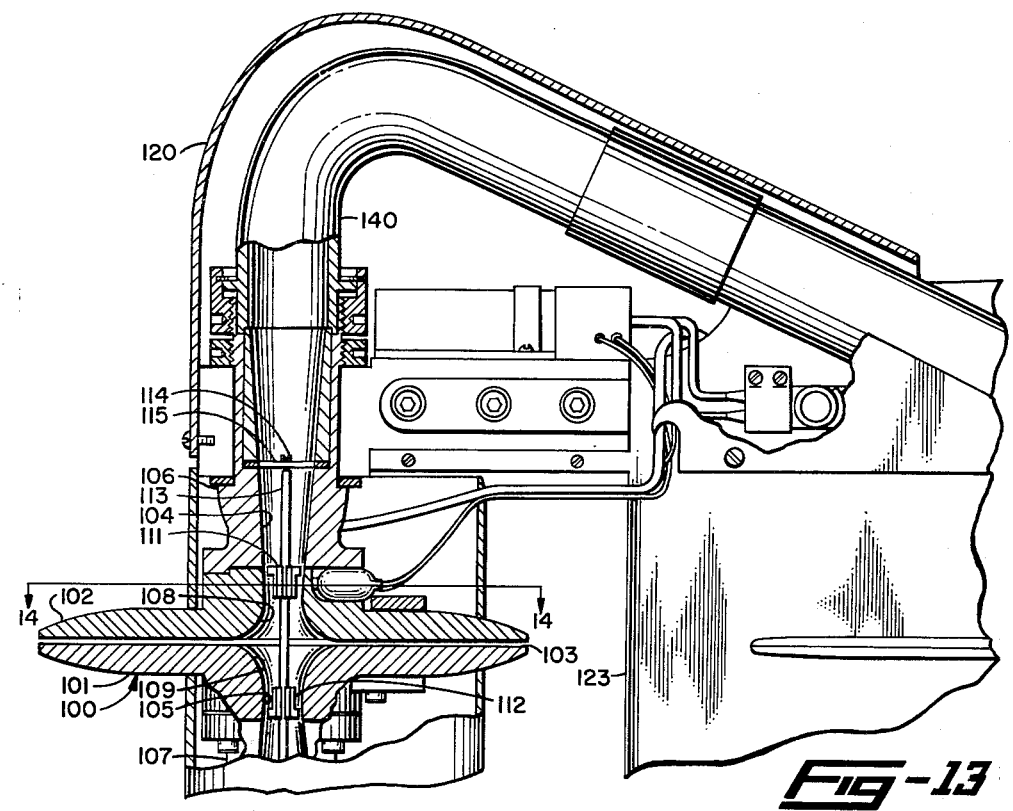
FIGURE 13 is a partial cross sectional view taken along line 13—13 in FIGURE 12.
Figure 12:
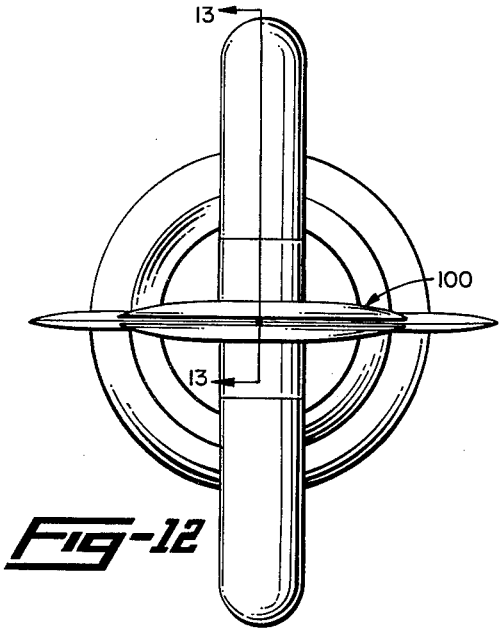
FIGURE 12 is a front elevation of the dynamic sampling device shown in FIGURE 10.

Another embodiment of the present invention is illustrated on FIGURES 10 through 14. Referring now to FIGURE 13, a basic turbulence detector 100 is shown which is quite similar to the turbulence detector 10 illustrated in FIGURES 1 and 2. Note that a pair of discs 101, 102 are positioned in spaced relation to each other to provide a circumferential inlet 103. Outlets 104, 105 are positioned at right angles to the spaced discs 101, 102. The cylindrical posts 106, 107 are fixedly attached to each of the discs 102 and 101, respectively, and the discs have venturi shaped passageways 108, 109 therethrough.

In essence, the present embodiment has two turbulence detectors placed back to back and having the spaced discs 101, 102 positioned parallel to the direction of motion. Each detector has a vaned impeller 111, 112 integrally formed or attached to a common shaft 113. A means for supporting the shaft 113, such as a jewel bearing 114 engages one end of the common shaft 113. A support shaft 115 is fixedly attached to the supporting means 114 and to the cylindrical post.

Referring now to FIGURE 10 and FIGURE 13, support arms 120 and 121 are fixedly attached to each respective disc 102 and 101. This arrangement allows the turbulence detector to be supported and not have support arms or fastening means interrupting the flow of fluid between the spaced discs. The arms 120, 121 project at right angles to the discs 101 and 102, are then curved rearwardly, and attached to the base 123 at a position in spaced relation to the turbulence detector 100. A second pair of arms 125, 126 are fixedly attached to the base 123 and support the venturi shaped exhaust outlet 130.

Referring again to FIGURE 13, an outlet conduit 140 is fixedly attached and contiguously formed to the cylindrical post 106 and is also contiguous with the outlet 104. As illustrated in FIGURES 10 and 13 the conduit 140 is contained by the arm 120 and extends into the venturi shaped outlet 130.

This arrangement allows the turbulence meter 100 to create its own suction device by forcing the fluid between the discs 101, 102 through the outlet 104 and the conduit 140 into the venturi shaped outlet 130. As the fluid is exhausted from the outlet 130, the pressure drops as it expands through the venturi passageway causing a partial vacuum to be formed. This partial vacuum aids in sucking the fluid from the outlet 104 and the conduit 140.

Figure 14:
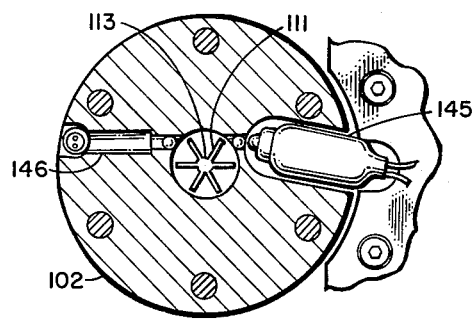
FIGURE 14 is a partial cross sectional view taken along line 14—14 in FIGURE 13.

Referring now to FIGURE 14, a light source 145 and a photo-diode 146 are positioned on opposite sides of the vaned impeller 111. This arrangement is identical to the arrangement illustrated in FIGURE 7 and may have the same arrangement for the power supply batteries, D.C. amplifier, and Brush Recorder (not illustrated).

The embodiment shown in FIGURES 10 through 14 is especially useful for a dynamic sampling situation and is quite comparable to the detector, illustrated in FIGURE 5, and is used in a similar manner.

While I have shown my invention in certain illustrated embodiments, it will be obvious to those skilled in the art that my invention is not necessarily so limited, but is susceptible to various other changes and modifications without departing from the spirit thereof, and I desire therefore, that only such limitations shall be placed thereupon as are specifically set forth in the appended claims.

I claim:

1. In a turbulence detector attached to a suction means comprising: a first and a second plate, said plates being generally parallel and in spaced relationship to each other, said first plate having a venturi passageway therethrough extending substantially perpendicular to said plates and spaced from the outer periphery of said first plate, an impeller rotatably received by the said venturi passageway and coaxial therewith, rotative supporting means attached to the said first plate receiving the said impeller, and said impeller having a plurality of axially positioned flat radial vanes.

2. In a turbulence detector attached to a suction means comprising: a first and a second cylindrical plate being generally parallel and in spaced relation to each other, a cylinder integrally formed on the said first cylindrical plate and spaced from the outer periphery of said first plate, said cylinder having a venturi-shaped passageway therethrough extending through the said first cylindrical plate and substantially perpendicular thereto, an impeller having flat axially positioned vanes substantially axially disposed and rotatively received in the throat of said venturi-shaped passageway, a curved protuberance attached to the said second cylindrical plate and co-axially positioned with the said impeller and directed toward said venturi-shaped passageway, said protuberance rotatively supporting one end of said impeller, and a support bearing attached to the said cylinder rotatively receiving the other end of the said impeller.

3. In a turbulence detector attached to a means for inducing fluid flow comprising: inlet means for directing radial inflow of fluid, a means for exhausting fluid having a venturi-shaped passageway formed therein, said fluid exhausting means being attached to said inlet means and being disposed substantially perpendicular thereto such that radial inflow of fluid through said inlet means will occur in a radially inward direction with respect to the axis of said fluid exhausting means and in substantially perpendicular relation thereto, and means for detecting nonlaminar fluid flow positioned within said venturi passageway, said detecting means being responsive to the continuously varying net angular momentum of the fluid sampled as it enters said inlet means.

4. In a turbulence detecting system comprising: an impeller, inlet means for directing radial inflow of fluid into a portion of said system, means for exhausting fluid attached to said inlet means and being disposed substantially perpendicular thereto such that radial inflow of fluid through said inlet means will occur in a radially inward direction with respect to the axis of said fluid exhausting means and in substantially perpendicular relation thereto, said impeller being positioned coaxially within said fluid exhausting means, and said fluid exhausting means including a venturi-shaped passageway disposed adjacent to the radially inner end of said inlet means.

5. In a turbulence detecting system as defined in claim 4, wherein the said impeller has a plurality of flat radial vanes thereon, some of said impeller vanes having a notch therein for aiding a counting means in determining the number of revolutions per unit time.

6. In a turbulence detecting system as defined in claim 4, wherein said fluid inlet means comprises a pair of parallel discs in spaced relation and said discs positioned coaxially with said venturi-shaped passageway.

7. A turbulence detector attached to a suction means comprising: a first and a second plate, said plates being generally parallel and in spaced relationship to each other, said first plate having a venturi passageway therethrough extending substantially perpendicular to said plates and spaced from the outer periphery of said first plate, an impeller rotatably received by the said venturi passageway and coaxial therewith, rotative supporting means attached to the said first plate receiving the said impeller, said impeller having a plurality of axially positioned flat radial vanes, and indicating means for indicating the rate of rotation of said impeller.

8. A turbulence detector attached to a suction means comprising: a first and a second cylindrical plate being generally parallel and in spaced relation to each other, a cylinder integrally formed on the said first cylindrical plate and spaced from the outer periphery of said first plate, said cylinder having a venturi-shaped passageway therethrough extending through the said first cylindrical plate and substantially perpendicular thereto, an impeller having flat axially positioned vanes substantially axially disposed and rotatively received in the throat of said venturi-shaped passageway, a curved protuberance attached to the said second cylindrical plate and co-axially positioned with the said impeller and directed toward said venturi-shaped passageway, said protuberance rotatively supporting one end of said impeller, a support bearing attached to the said cylinder rotatively receiving the other end of the said impeller, and indicating means for indicating the rate of rotation of said impeller.

9. A turbulence detecting system comprising: an impeller, inlet means for directing radial inflow of fluid into a portion of said system, means for exhausting fluid attached to said inlet means and being disposed substantially perpendicular thereto such that radial inflow of fluid through said inlet means will occur in a radially inward direction with respect to the axis of said fluid exhausting means and in substantially perpendicular relation thereto, said impeller being positioned co-axially within said fluid exhausting means, said fluid exhausting means including a venturi-shaped passageway disposed adjacent to the radially inner end of said inlet means, said inlet means comprising a pair of parallel discs in spaced relation positioned co-axially with said venturi-shaped passageway, and indicating means for indicating the rate of rotation of said impeller.

10. In a turbulence detector attached to a suction device comprising: a housing having inlet means for directing radial inflow of fluid into said detector, said housing having an outlet attached to said inlet means and being disposed substantially perpendicular thereto such that radial inflow of fluid through said inlet means will occur in a radially inward direction with respect to the axis of said outlet and in substantially perpendicular relation thereto, said suction device being attached to said outlet, a shaft longitudinally disposed within said outlet, a plurality of vanes longitudinally attached to said shaft, rotative support means attached to said shaft, said shaft being freely and rotatively supported by said support means, said outlet having a venturi passageway formed therein, and said shaft and said vanes being received in the throat of said venturi passageway.

References Cited by the Examiner

UNITED STATES PATENTS

| | | | |
|---|---|---|---|
| 2,112,300 | 3/38 | Moody | 253—148 |
| 2,215,447 | 9/40 | Kollsman | 33—204.3 |
| 2,714,310 | 8/55 | Jennings | 73—194 |
| 2,772,567 | 12/56 | Boden et al. | 73—231 |
| 2,814,949 | 12/57 | Bodge | 73—194 |

RICHARD C. QUEISSER, *Primary Examiner.*

CHARLES A. CUTTING, JOSEPH P. STRIZAK,
*Examiners.*